United States Patent [19]
Ogawa et al.

[11] Patent Number: 6,122,027
[45] Date of Patent: Sep. 19, 2000

[54] LIQUID CRYSTAL DISPLAY DEVICE WITH COLOR FILTERS BETWEEN REFLECTOR AND TRANSPARENT CONDUCTOR

[75] Inventors: Tetsu Ogawa, Ishikawa; Shinji Hisamitsu, Osaka; Shingo Fujita, Nara, all of Japan

[73] Assignee: Matsushita Electric Industrial Co., Ltd., Osaka, Japan

[21] Appl. No.: 09/156,308

[22] Filed: Sep. 17, 1998

[30] Foreign Application Priority Data

Sep. 17, 1997 [JP] Japan .................................. 9-251201

[51] Int. Cl.$^7$ ................................................ G02F 1/1335
[52] U.S. Cl. ............................................ 349/113; 349/106
[58] Field of Search .................................. 349/113, 106, 349/122, 138, 139

[56] References Cited

U.S. PATENT DOCUMENTS

| | | | |
|---|---|---|---|
| 4,953,952 | 9/1990 | Okumura et al. | 350/337 |
| 5,058,997 | 10/1991 | Dickerson | 359/59 |
| 5,079,214 | 1/1992 | Long et al. | 359/68 |
| 5,529,817 | 6/1996 | Smith, Jr. et al. | 428/1 |
| 5,633,738 | 5/1997 | Wakui et al. | 349/46 |
| 5,734,455 | 3/1998 | Yoshida et al. | 349/99 |
| 5,812,228 | 9/1998 | Miura et al. | 349/106 |
| 5,831,708 | 11/1998 | Hiraishi et al. | 349/143 |
| 5,926,236 | 7/1999 | Den Boer et al. | 349/51 |
| 5,936,693 | 8/1999 | Yoshida et al. | 349/139 |

FOREIGN PATENT DOCUMENTS

| | | |
|---|---|---|
| 0 412 921 | 2/1991 | European Pat. Off. . |
| 0 600 349 | 6/1994 | European Pat. Off. . |
| 0 780 721 | 6/1997 | European Pat. Off. . |
| 60-133423 | 9/1985 | Japan . |
| 62-262826 | 11/1987 | Japan . |

OTHER PUBLICATIONS

European Search Report corresponding to application No. EP 98 11 7049 dated Jan. 13, 1999.
I. Fukuda et al., "Electro–Optical Propoerties of a Reflective STN–LCD with One Polarizer and One Retardation Film", ASIA Display '95, pp. 881–885.
H. Yamaguchi et al., "A Reflective Color STN–LCD with a Single Polarizer and Double Retardation Films", SID 97 Digest, pp. 647–650.

*Primary Examiner*—Kenneth Parker
*Attorney, Agent, or Firm*—Ratner & Prestia

[57] ABSTRACT

A reflective liquid crystal display device comprises a substrate, a transparent substrate facing the substrate, and a liquid crystal layer sandwiched between the substrate and the transparent substrate, and further comprises first transparent electrodes, an electrically insulating separating layer and a reflective film formed in that order from the liquid crystal layer side at the inward-facing surface of the substrate, and also comprises a second transparent electrode included in the inward-facing surface of the transparent substrate. The electrically insulating separating layer physically and electrically separates the reflective film made of Al from the first transparent electrodes, so that durability against chemicals at processing and reliability are improved.

3 Claims, 10 Drawing Sheets

LIQUID CRYSTAL DISPLAY DEVICE WITH COLOR FILTERS BETWEEN REFLECTOR AND TRANSPARENT CONDUCTOR

FIELD OF THE INVENTION

The present invention relates to a reflective liquid crystal display device in which the reflective surface is disposed in a liquid crystal cell.

BACKGROUND OF THE INVENTION

In parallel with rapid popularization of the Internet, the infrastructure for easy data access and dispatch at any place and at any time is being proceeded. At present, the main roll of interface devices is played by a "Personal Digital Assistant" (hereinafter abbreviated PDA).

The PDA, being for mobile use, is desired to be thin, light and having less power consumption. A reflective liquid crystal display device (hereinafter abbreviated LCD) which does not need a back light is considered to be most suitable for this purpose. Thus, the majority of PDA products adopt the reflective LCD.

The PDA is expected to harmonize functionally with the display units of a hand-held computer, a note book type personal computer, a network computer, a digital camera, etc. It is also expected to build a huge market as a mobile business tool which is a main device of "The Mobile Office" which has been proposed as a new business environment in parallel with infrastructure setup such as high speed communication systems, mobile communication operating systems, etc.

Although a black and white reflective LCD is mostly used at present, a color reflective LCD is desired. Research and development are actively being done in this area. Therefore big demand of the color reflective LCD is expected as a key device of the mobile business tool.

Although various types of reflective LCDs are researched and developed, a single polarizer type is proposed as a promising type for realizing a bright display in place of a double-polarizer type. In LCDs, there are two types. One is an active matrix type and another is a single matrix type. The former is for performance oriented use and the latter is for cost oriented use.

The structure of the single polarizer LCD is shown, for example, in the following publications:

1) Regarding the black and white reflective LCD,
   I. Fukada, M. Kitamura, Y. Kotani: ASIA DISPLAY '95 pp. 881–884 (1995).
2) Regarding the color reflective LCD,
   H. Yamaguchi, S. Fujita, N. Naito, H. Mizuno, T. Otani, T. Sekime, T. Ogawa, N. Wakita: SID 97 DIGEST pp. 647–650 (1997).

Figure 10:
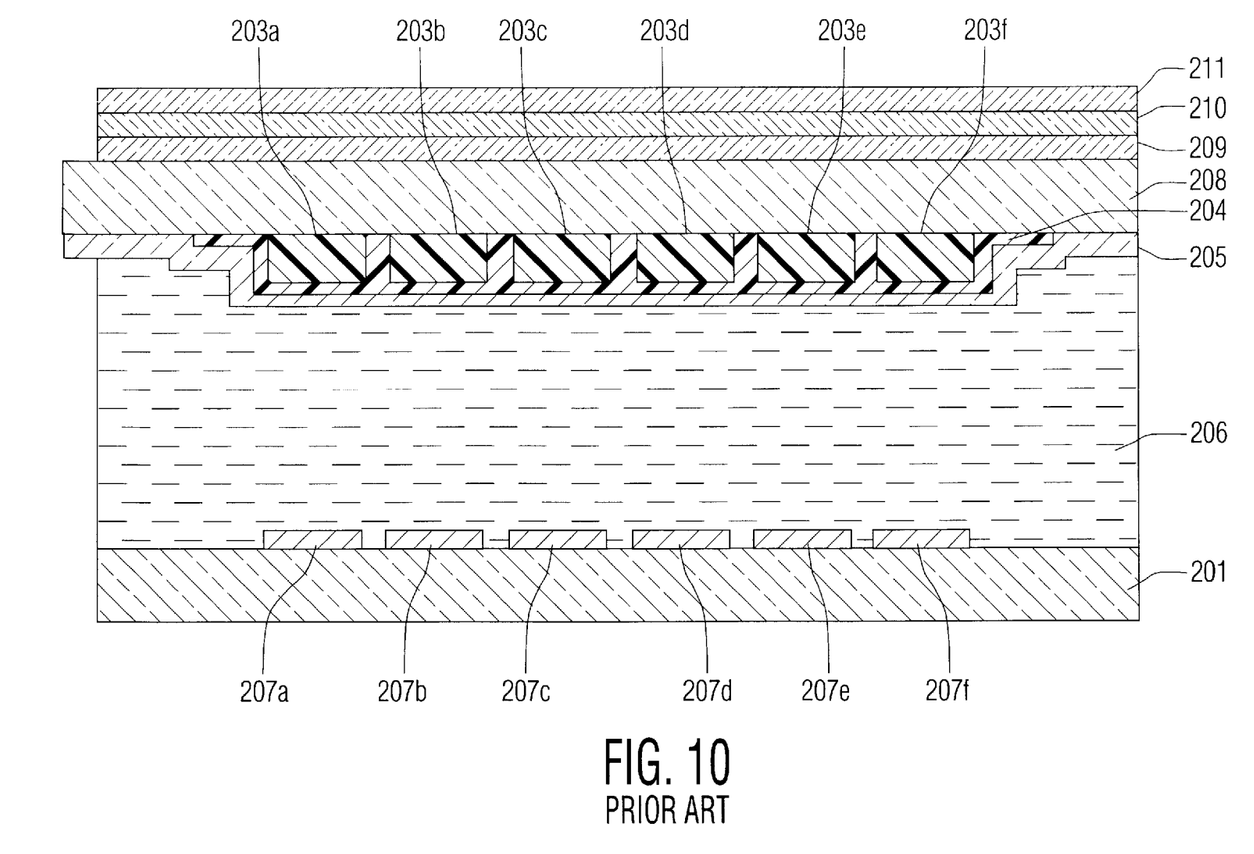
FIG. 10 shows a cross sectional view of a conventional reflective LCD.

FIG. 10 shows a representative example of a conventional single polarizer color LCD. On a substrate 201, striped reflective electrodes 207a–207f are formed. Between the substrate 201 and its facing transparent substrate 208, a liquid crystal layer 206 is sandwiched. For the liquid crystal layer 206, "Twisted Nematic" (hereinafter abbreviated TN) liquid crystal or "Super Twisted Nematic" (hereinafter abbreviated STN) liquid crystal is used. In most cases, the TN liquid crystal is used for the active matrix type and the STN liquid crystal is used for the single matrix type. At the inward-facing surface of the transparent substrate 208, color filters 203a–203f are formed corresponding to reflective electrodes 207a–207f, and also striped transparent electrodes 205 are formed sandwiching protecting layer 204 in-between, and directing the stripes to a right angled direction with that of the stripes of the reflective electrodes 207a–207f. At the outward-facing surface of the transparent substrate, a polarizer 211, a phase compensation plate 210 and a scattering plate 209 are laid bonded from outside in order.

The single-polarizer reflective LCD provides a brighter display compared with the double-polarizer reflective LCD because the light passing frequency through the polarizer(s) decreases from four times to two times. Also, in the single polarizer type, the reflective electrodes 207a–207f can be built in liquid crystal cells, so that a display of less parallax is obtainable. Especially in case of a color reflective LCD which adopts color filters, the single polarizer type can minimize the probability that incoming light and outgoing light pass through different color domains, which also provides a high color purity and brighter display.

For getting good alignment of LCD, the plane surface of an electrode is desired. However, in the plane reflective electrode, due to the strong specular reflection, the reflective luminance except for certain directions becomes extremely small, so that a direct view reflective LCD cannot be realized as it is. In order to cover this problem, a scattering plate 209 is disposed in a light propagation path. In the single-polarizer reflective LCD, different from the double-polarizer reflective LCD which has a scattering reflective plate at the back side, the optical system is so composed that the scattering function is separated from the reflection function.

In most cases, aluminum (hereinafter abbreviated Al) is used for the reflective electrodes 207a–207f because Al is less expensive and has a high reflective characteristic of less wavelength dependence.

However such conventional reflective LCD has the following problems. Since the reflective electrodes 207a–207f are carried through an inspection process and so on exposing the surface, scratching is liable to occur. Thus, the handling is difficult.

Also, since the reflective electrodes 207a–208f are exposed during cell assemble processes, the durability to an acid, alkali or a solvent is not sufficient, so that the corrosion by such chemicals are worried.

Also, since the reflective electrodes 207a–207f contact directly with the liquid crystal, it is difficult to maintain durability against corrosion. Particularly, it is difficult to keep reliability in a constant-voltage loading test under high temperature and high humidity conditions.

The above problems are especially liable to occur when Al is used. The present invention aims to provide, by relatively simple structure, a bright and less parallax reflective LCD which is also superior in processing and reliability.

SUMMARY OF THE INVENTION

A reflective LCD comprises a substrate, a transparent substrate facing the substrate, and a liquid crystal layer sandwiched between the substrate and the transparent substrate. The reflective LCD further comprises first transparent electrodes, an electrically insulating separating layer and a reflective film, which are formed in this order from the liquid crystal layer side at the inward-facing surface of the substrate. Second transparent electrodes are included in the inward-facing surface of the transparent substrate. The electrically insulating separating layer separates electrically and physically the reflective film from the first transparent electrodes.

In this structure, the surface of the reflective film is covered and protected by the separating layer, and the reflective surface is disposed in a liquid crystal cell, so that the feature of a single polarizer type is kept. This is superior in processing and reliability, is less parallax and results in a bright display.

In actual application, the first and the second transparent electrodes compose a group of transparent electrodes, or a single transparent electrode, or a group of pixel electrodes which are combined with active matrix array. Also by forming an additional insulating layer on the surface of the reflective film, durability against a solvent and corrosion is improved. The insulating layer can be formed by anodic oxidation of the reflective film. The insulating layer can also be composed by forming an insulating thin film on the surface of the reflective film by sputtering. The main composition of the reflective film can be Al.

DESCRIPTION OF THE PREFERRED EMBODIMENT

First Exemplary Embodiment

Figure 1:
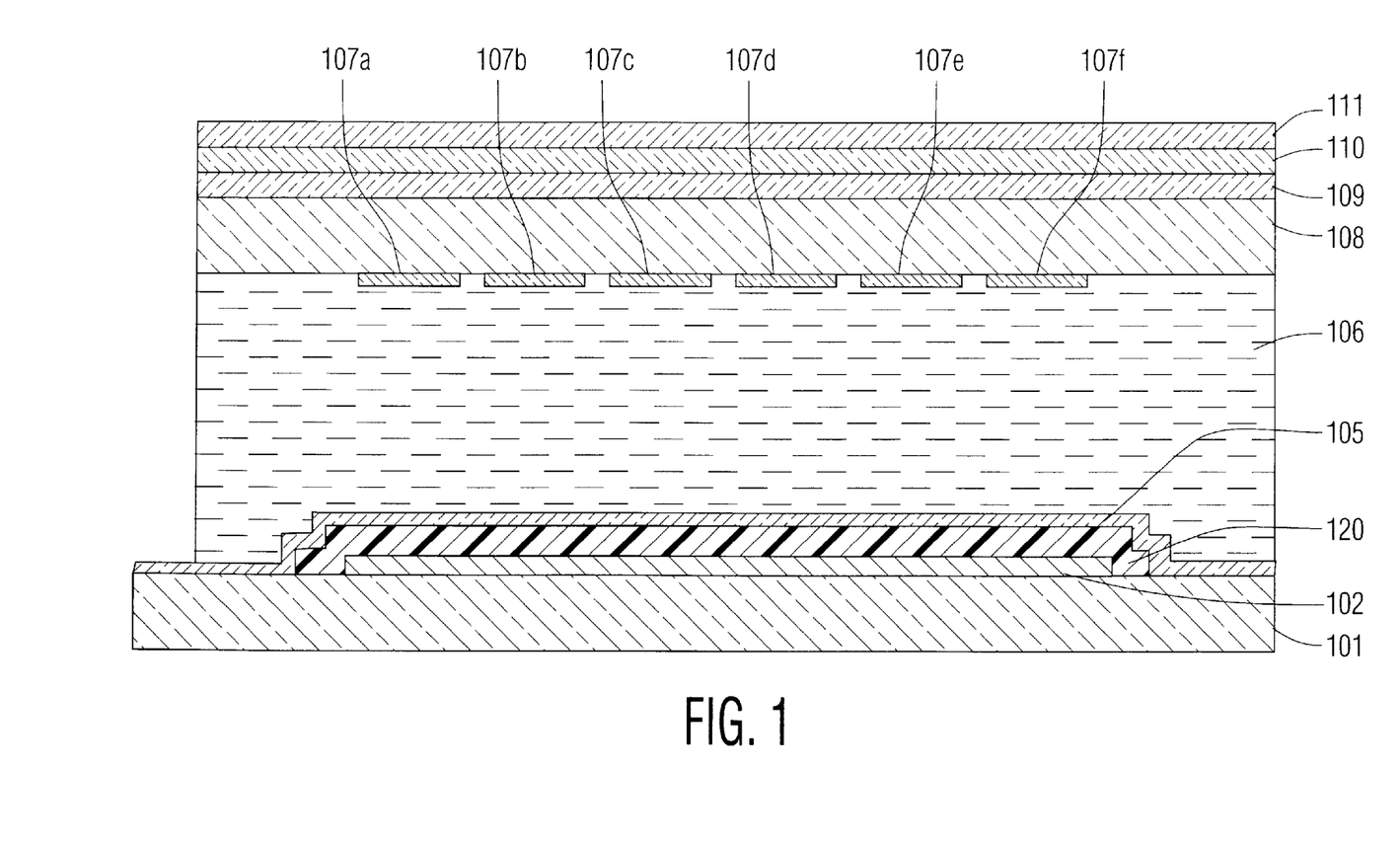
FIG. 1 shows a cross sectional view of the reflective LCD in accordance with a first exemplary embodiment of the present invention.

In the following, explanation is made of a reflective LCD of the first exemplary embodiment of the present invention referring to FIG. 1 showing a cross sectional view of the exemplary embodiment.

On a substrate 101 made of a material such as glass, a reflective film 102 of preferably Al is selectively formed at the domain nearly corresponding to a display part.

On a reflective film 102, an electrically insulating separating layer 120 is formed, and on that, a plurality of striped first transparent electrodes 105 are selectively formed. For the first transparent electrodes, indium tin oxide (ITO) is used. The separating layer 120 is formed to insulate physically and electrically the reflective film 102 from the first transparent electrodes 105. If ITO and Al are electrically contacted, ITO is corroded by an electrochemical reaction when the patterning of ITO is made by wet etching. Such corrosion is suppressed by the structure described above. For the separating layer 120, acrylic resin, which has good transparency and is electrically insulating, is used.

Between the substrate 101 and its facing transparent substrate 108 made of glass or the like, a liquid crystal layer 106 is sandwiched. For the liquid crystal layer 106, STN liquid crystal is used.

At the inward-facing surface of the transparent substrate 108, ITO for the striped second transparent electrodes 107a–107f are selectively formed directing the stripes to a right-angled direction with that of stripes of the first transparent electrodes 105.

At the outward-facing surface of transparent substrate 108, a polarizer 111, a phase compensation plate 110 and a scattering plate 109 are laid bonded from outside in order.

In the reflective LCD described above, the liquid crystal can be driven by applying electric potential between the first transparent electrodes 105 and the second transparent electrodes 107a–107f. This is so-called single matrix driving.

In this structure, since the surface of reflective film 102 is covered by the separating layer 120, scratching during the assembling process hardly occurs, and inspection and handling is easy.

Also, even if Al, which is weak against an acid or alkali, is adopted for the reflective film 102, the durability against chemicals in the assembling process of liquid crystal cells is good because the reflective film 102 is covered by the separating layer 120, and also the reliability in constant-voltage loading test under high temperature and high humidity conditions are good.

On the other hand, since the reflective surface is disposed in the liquid crystal cell, the feature of a single polarizer type is kept, so that a less parallax and high brightness monochrome reflective LCD is realized.

Second Exemplary Embodiment

Figure 2:
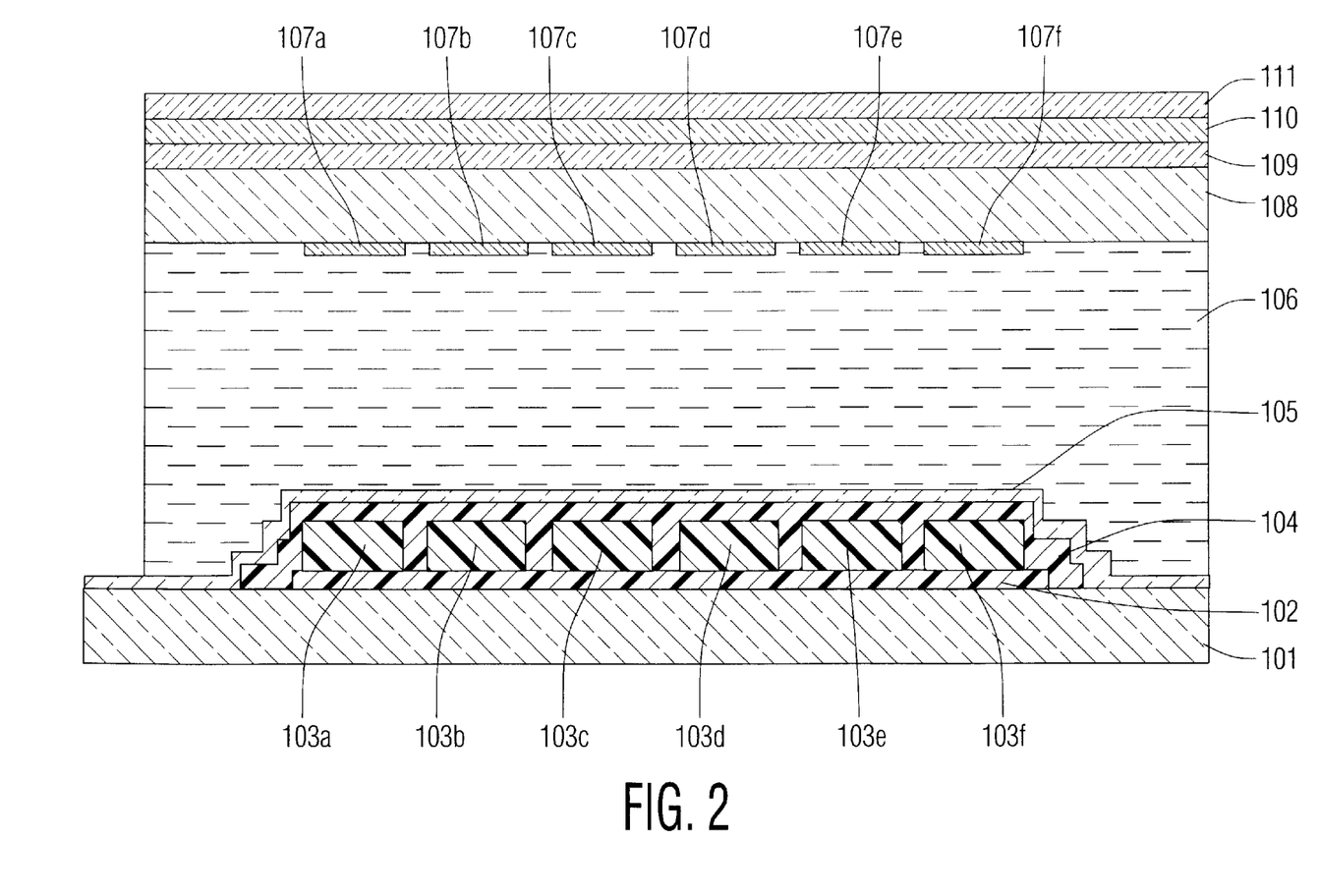
FIG. 2 shows a cross sectional view of the reflective LCD in accordance with a second exemplary embodiment of the present invention.

In the following, explanation is made on the reflective LCD of the second exemplary embodiment of the present invention referring to FIG. 2 showing a cross sectional view of the exemplary embodiment. For composing elements which have the same function as in FIG. 1 showing the first exemplary embodiment, the same reference numerals are applied and the explanation is omitted.

On a substrate 101, Al for a reflective film 102 is selectively formed at the domain nearly corresponding to a display part.

On the reflective film 102, electrically insulating striped color filters 103a–103f are selectively formed and these are covered by an electrically insulating protecting layer 104, then the first transparent layer 105 is selectively formed on them. Namely, the roll of the separating layer 120 in the first exemplary embodiment is played by the color filters 103a–103f and by the protecting layer 104, so that the corrosion caused by electrochemical reaction during the patterning process of the transparent electrode 105 is suppressed. For the transparent electrode 105, indium tin oxide (ITO) is used. For the protecting layer, acrylic resin, which has good transparency and is electrically insulating, is used.

Between the substrate 101 and its facing transparent substrate 108, a liquid crystal layer 106 is sandwiched. For the liquid crystal layer 106, STN liquid crystal is used.

At the inward-facing surface of the transparent substrate 108, second transparent electrodes 107a–107f are selectively formed corresponding to the color filters 103a–103f.

At the outward-facing surface of the transparent substrate 108, a polarizer 111, a phase compensation plate 110 and a scattering plate 109 are laid bonded from outside in order.

In the reflective LCD described above, the liquid crystal can be driven by applying electric potential between the first transparent electrodes 105 and the second transparent electrodes 107a–107f.

In the structure described above, since the reflective film 102 is completely covered by the color filters 103a–103f and also by the protecting layer 104, scratching during the assembling process, as is seen in a conventional reflective electrode, hardly occurs and inspection and handling is easy.

And also in this exemplary embodiment, since the color filters and the protecting layer have the function of the separating layer too, the process of forming the separating layer can be omitted.

And also, even if Al, which is weak against an acid or alkali, is adopted for the reflective film 102, the durability against chemicals at the assembling process of liquid crystal cells is good and also the reliability in constant-voltage loading test under high temperature and high humidity condition is also obtainable.

On the other hand, since the reflective surface is disposed in the cell, the feature of a single polarizer type is kept, so that a less parallax, higher brightness and higher color purity color reflective LCD is realized.

Third Exemplary Embodiment

Figure 3:
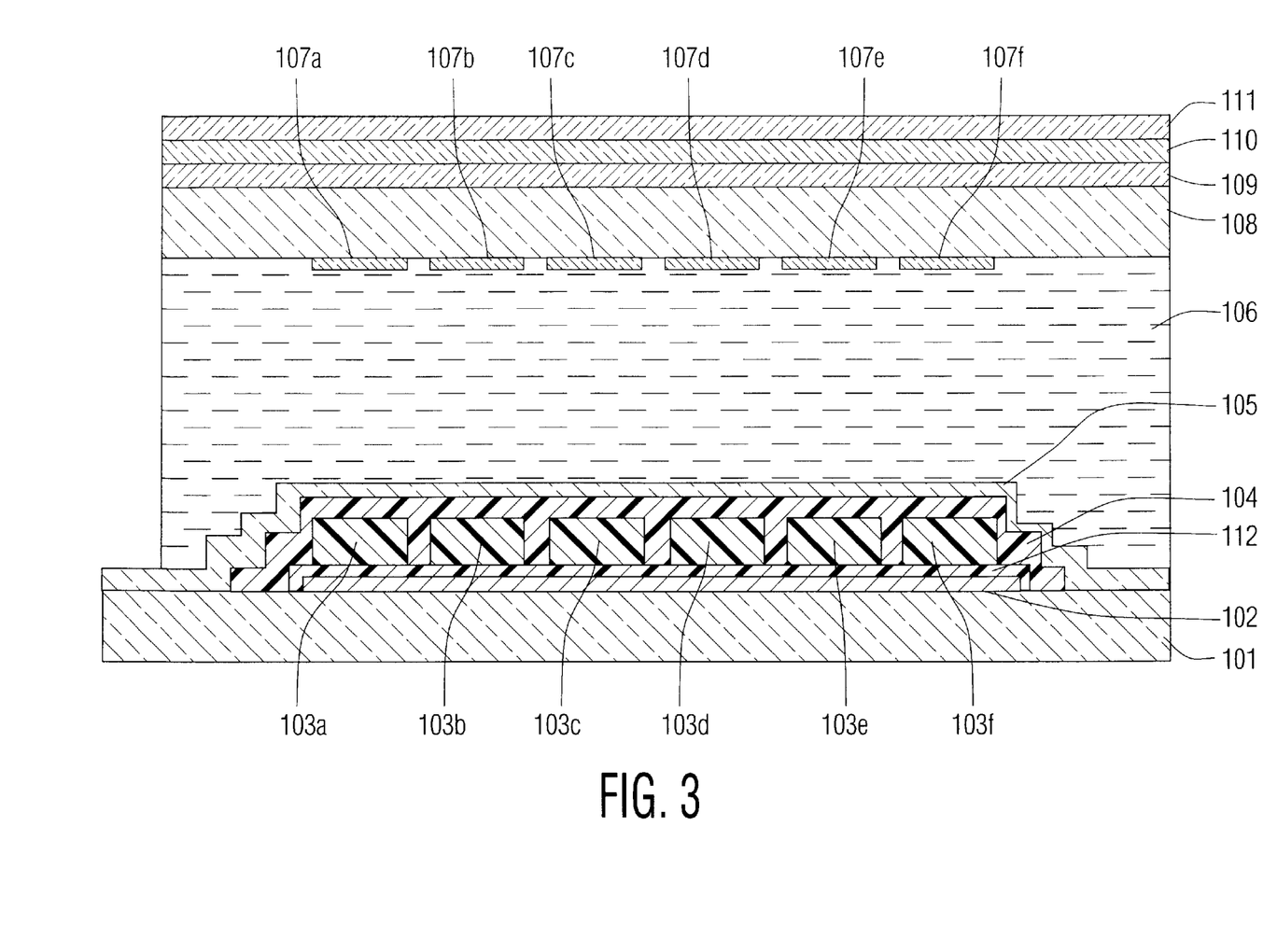
FIG. 3 shows a cross sectional view of the reflective LCD in accordance with a third and the fourth exemplary embodiments of the present invention.

In the following, explanation is made on the reflective LCD of the third exemplary embodiment of the present invention referring to FIG. 3 showing a sectional view of the exemplary embodiment. For elements which have the same function as in FIG. 2 showing the second exemplary embodiment, the same reference numerals are applied and the explanation is omitted.

The difference from the second exemplary embodiment is that a new insulating layer 112 is provided on the surface of a reflective film. Namely, as shown in FIG. 3, an insulating layer 112 is laid between the reflective film 102 and color filters 103a–103f, and the whole surface of the reflecting film 102 is covered by the insulating layer 112.

In the actual application, preferably oxidized tantalum (TaOx) by sputtering is used for the insulating layer 112, then the durability of reflective film 102 against chemicals and corrosion is further improved.

Fourth Exemplary Embodiment

In the following, explanation is made on the reflective LCD of the fourth exemplary embodiment of the present invention referring to FIG. 3 showing a cross sectional view of the exemplary embodiment. The difference of this exemplary embodiment from the third exemplary embodiment is in the composition of an insulating layer 112. In the fourth embodiment, the insulating layer 112 in FIG. 3 is formed by anodic oxidation of Al which is used for a reflective film 102.

After selectively forming Al on a substrate 101, oxidized aluminum (AlOx) is formed by anodic oxidation by setting the reflective film 102 as an electrode of one side in the mixed liquid of oxalic acid ammonium and ethylene glycol.

In the insulating layer formed by this anodic oxidation, the probability of occurrence of pinholes is extremely small from its principle, so that the isolation effect from a solvent and water is greatly improved. Therefore, the durability against chemicals and corrosion of the reflective film is further improved from that of the second exemplary embodiment.

Fifth Exemplary Embodiment

Figure 4:
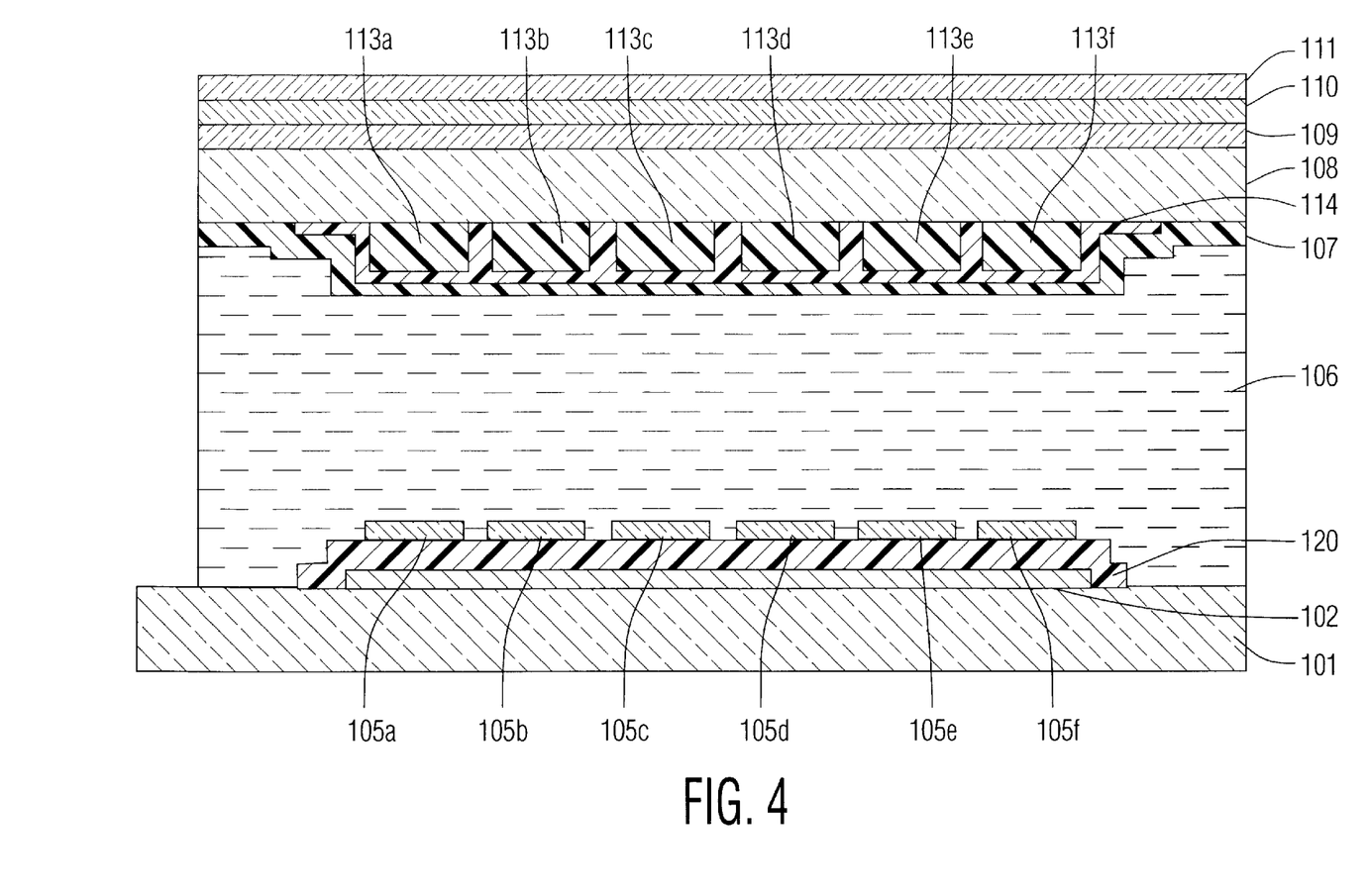
FIG. 4 shows a cross sectional view of the reflective LCD in accordance with a fifth exemplary embodiment of the present invention.

In the following, explanation is made on the reflective LCD of the fifth exemplary embodiment of the present invention referring to FIG. 4 showing a cross sectional view of the exemplary embodiment. For composing elements which have the same function as in FIG. 1 showing the first exemplary embodiment, the same reference numerals are applied and the explanation is omitted. In this exemplary embodiment, color filters are provided at a transparent substrate 108 side.

On a substrate 101, Al for a reflective film 102 is selectively formed at the domain nearly corresponding to a display part.

On a reflective film 102, an electrically insulating separating layer 120 is formed, and on that, a plurality of striped first transparent electrodes 105a–105f are selectively formed. For the first transparent electrodes 105a–105f, indium tin oxide (ITO) is used. The separating layer 120 is formed to insulate electrically the reflective film 102 from the first transparent electrodes 105a–105f. By electrically insulating the reflective film 102 from the first transparent electrodes 105a–105f, corrosion caused by electrochemical reaction at the time of patterning of the first transparent electrodes 105a–105f is suppressed. For the separating layer 120, acrylic resin, which has good transparency and is electrically insulating, is used.

Between the substrate 101 and its facing transparent substrate 108, a liquid crystal layer 106 is sandwiched. For the liquid crystal layer 106, STN liquid crystal is used.

At the inward-facing surface of the transparent substrate 108, electrically insulating striped color filters 113a–113f are selectively formed. Then, these are covered by a electrically insulating protecting layer 114, and then a plurality of striped second transparent electrodes 107 are selectively formed directing the stripes to a right angled direction with that of the stripes of the first transparent electrodes 105a–105f. In case of necessity, black matrixes are added to the color filters.

At the outward-facing surface of transparent substrate 108, a polarizer 111, a phase compensation plate 110 and a scattering plate 109 are laid bonded from outside in order.

In the reflective LCD described above, the liquid crystal can be driven by applying electric potential between the first transparent electrodes 105a–105f and the second transparent electrodes 107.

With the structure described above, the feature of a single polarizer type is also kept, so that a less parallax and higher brightness color reflective LCD, which is also superior on durability against chemicals and corrosion, is realized.

In each of the exemplary embodiments described above, the first and the second transparent electrodes are striped and the plan view shows that the stripes are disposed to make a right angle with each other, and composes the domain corresponding to a display part. Namely the example of so-called single matrix type is shown. The same effect is obtained even if the first or the second transparent electrode is a single transparent electrode which is flat all over the display part, that is a so called segment display type.

Sixth Exemplary Embodiment

Figure 5:
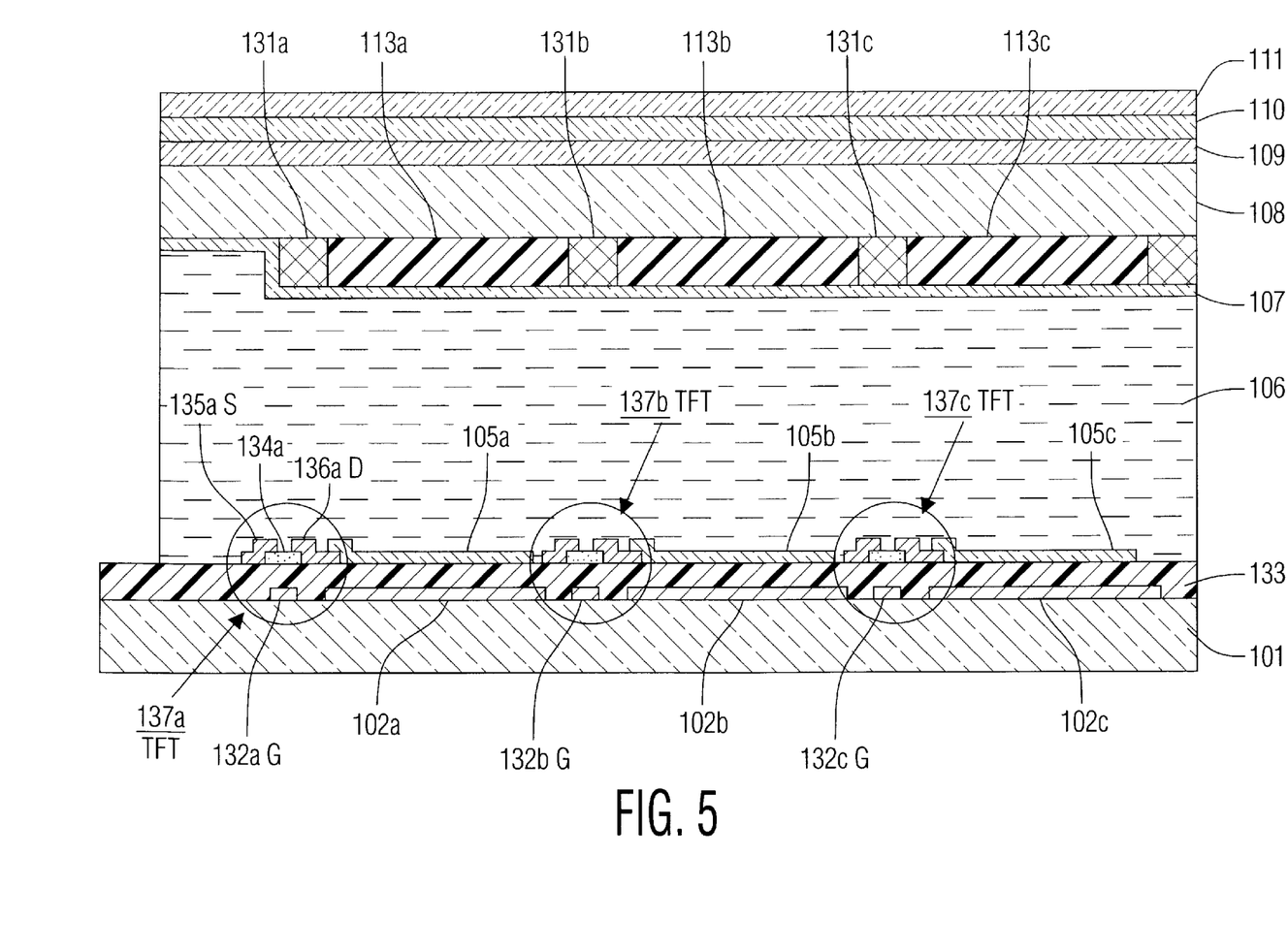
FIG. 5 shows a cross sectional view of the reflective LCD in accordance with a sixth exemplary embodiment of the present invention.
Figure 6:
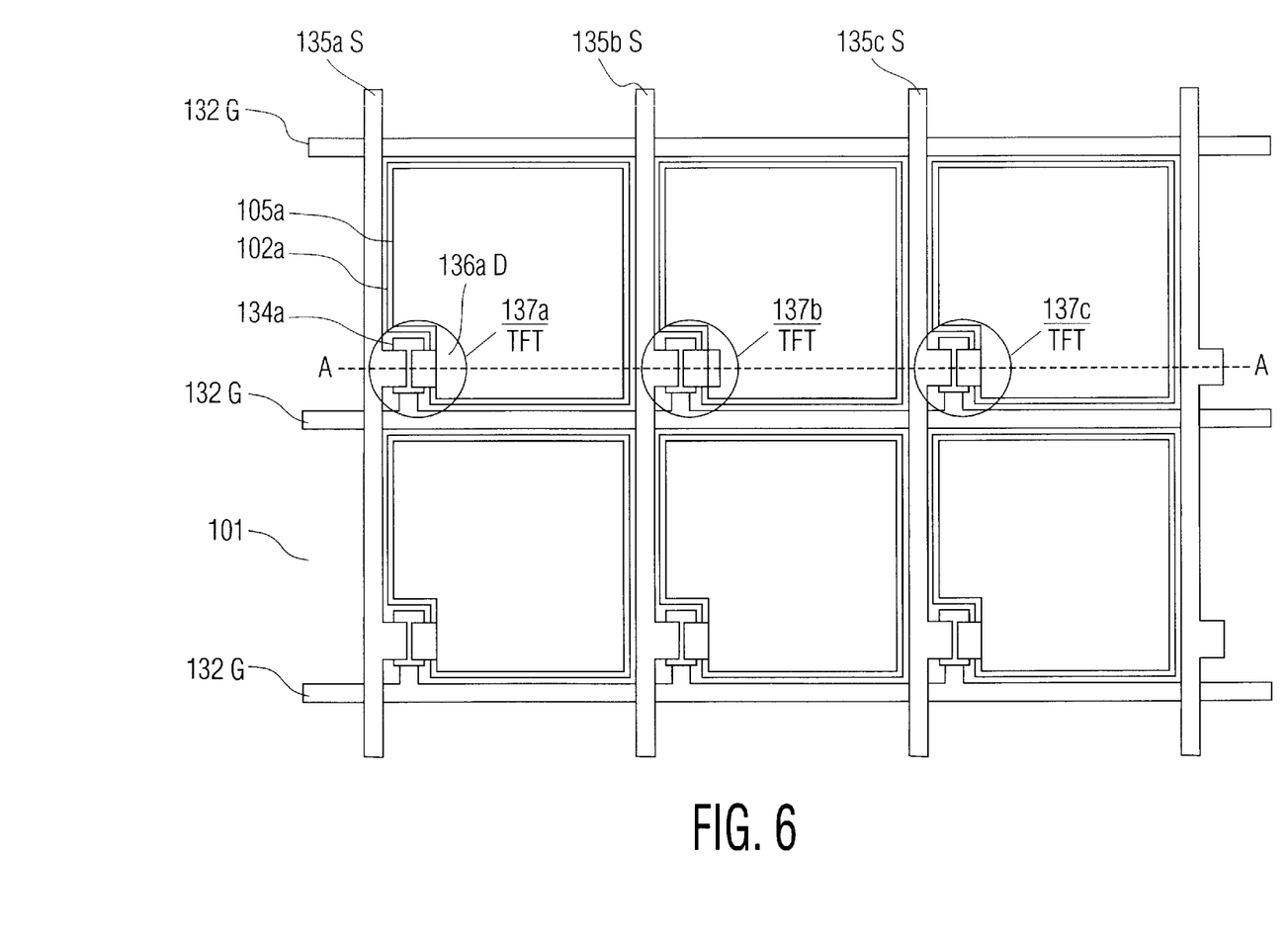
FIG. 6 is a plan view showing the structure of active matrix array of the reflective LCD in accordance with the sixth exemplary embodiment of the present invention.

In the following, explanation is made on the reflective LCD of the sixth exemplary embodiment of the present invention referring to FIG. 5 showing a cross sectional view and FIG. 6 showing a plan view of the exemplary embodiment. For elements which have the same function as in FIG. 4 showing the fifth exemplary embodiment, the same reference numerals are applied and the explanation is omitted.

In this embodiment, explanation is made on the reflective LCD in which an active matrix array is formed on a substrate 101. The active matrix array means that pixels are disposed in a matrix and the each pixel is connected to address line via switch which is an active element. In the LCD for which the active matrix array is adopted, the voltage applied to each pixel is independently controlled by the switch, so that picture quality is not deteriorated by phenomena such as crosstalk compared with a single matrix type, then a higher quality and higher color purity display is obtainable in case of a color LCD.

In this embodiment, the type in which a thin film transistor (TFT) is used for the active element is shown. Namely, as shown in FIG. 6, on the substrate 101, a plurality of pixel electrodes, viz., first transparent electrodes 105a–105f (hereinafter abbreviated 105) are disposed in matrix, and each of the TFTs 137a–137c (hereinafter abbreviated 137, marked "TFT" in the illustration) is connected to each pixel electrodes. For the first transparent electrodes, indium tin oxide (ITO) is used. Referring to FIG. 5 which shows a cross sectional view of the part of a dotted line of A—A in FIG. 6 which shows a plan view of this embodiment, explanation is made in the following. The TFT 137 comprises gate electrodes 132a–132c (hereinafter abbreviated 132, marked "G" in the illustration), a gate-insulating film 133 formed on those and made of silicon nitride, semiconductors 134a etc made of hydrogenated amorphous silicon, source electrodes 135a–135c (marked "S" in the illustration) which include molybdenum (Mo) alloy and drain electrodes 136a etc (marked "D" in the illustration). Between the semiconductor and the source or the drain electrodes, in some cases, in order to make a better electric contact, N-type impurities doped layer made of amorphous silicon which contains phosphorus is provided. The drain electrode 136a is connected to the first transparent electrode 105a. The gate electrodes 132a–132c in each row are connected to each other and form a gate address line. Source electrodes 135a–135c in each column are connected to each other and form source address line.

As shown in FIG. 5 and FIG. 6, on the domain corresponding to the first transparent electrodes 105, Al for reflective films 102a–102c (hereinafter abbreviated 102) are selectively formed. On the reflective films 102, a gate-insulating film 133 is formed. Then, on that, the first transparent electrode 105 is formed. Therefore, the first transparent electrode 105 is insulated electrically and physically from the reflective films 102 by the gate-insulating film 133.

In this exemplary embodiment, the reflective films 102 and the gate electrodes 132 are formed at the same level, and the same material Al is used for the both, so that there is a merit of producing a reflective LCD without increasing the production process.

Between the substrate 101 and its facing transparent substrate 108, a liquid crystal layer 106 is sandwiched.

For the liquid crystal layer 106, TN liquid crystal, which suits for an active matrix array, is used.

At the inward-facing surface of the transparent substrate 108, striped color filters 113a–113c are selectively formed, which correspond to the first transparent electrodes 105a–105c. Then, at the space between each stripe of the color filters, black matrixes 131a–131c are formed for the purpose of intercepting light. At the inward-facing surface of these, a second transparent electrode 107 is formed. In this exemplary embodiment, the second transparent electrode 107 is formed evenly all over the display domain. When improvement of smoothness of the surface is requested, a protecting layer is laid between the color filters and the second transparent electrode.

At the outward-facing surface of the transparent substrate 108, a polarizer 111, a phase compensating plate 110 and a scattering plate 109 are laid. When TN liquid crystal is adopted, the phase compensating plate 110 is not essential, but it is better to be adopted for increasing a viewing angle.

In the reflective LCD described above, the liquid crystal can be driven by applying electric potential between the first transparent electrodes 105 and the second transparent electrode 107. Especially in this exemplary embodiment, the voltages accurately corresponding to a display pattern can be applied. Namely, during the period when the gate voltage is "HIGH", the source electrode and the drain electrode become conductive with each other. Then the source voltage is transferred to pixel electrode viz., to the first transparent electrodes 105. Then, when the gate voltage becomes "LOW", the source electrode and the drain electrode are insulated for each other, so that the voltage, which is transferred to the transparent electrode 105 right before becoming the insulated state, is held until the gate voltage becomes "HIGH" next time. Then, as is well known, by properly controlling the voltage applied to the gate electrodes and the source electrode from outside driving circuit, the voltage which exactly corresponds to a display pattern can be applied to each pixel electrode.

In this structure which is different from the conventional reflective electrode, scratching during the assembling process hardly occurs and inspection and handling is easy. Also, even if Al, which is weak against an acid or alkali, is adopted for the reflective films 102, the durability against chemicals at the assembling process of liquid crystal cells is good, and the reliability in constant-voltage loading test under high temperature and high humidity condition is also good.

Also keeping the feature of a single polarizer type, a higher quality display is realized by the active matrix.

Seventh Exemplary Embodiment

Figure 7:
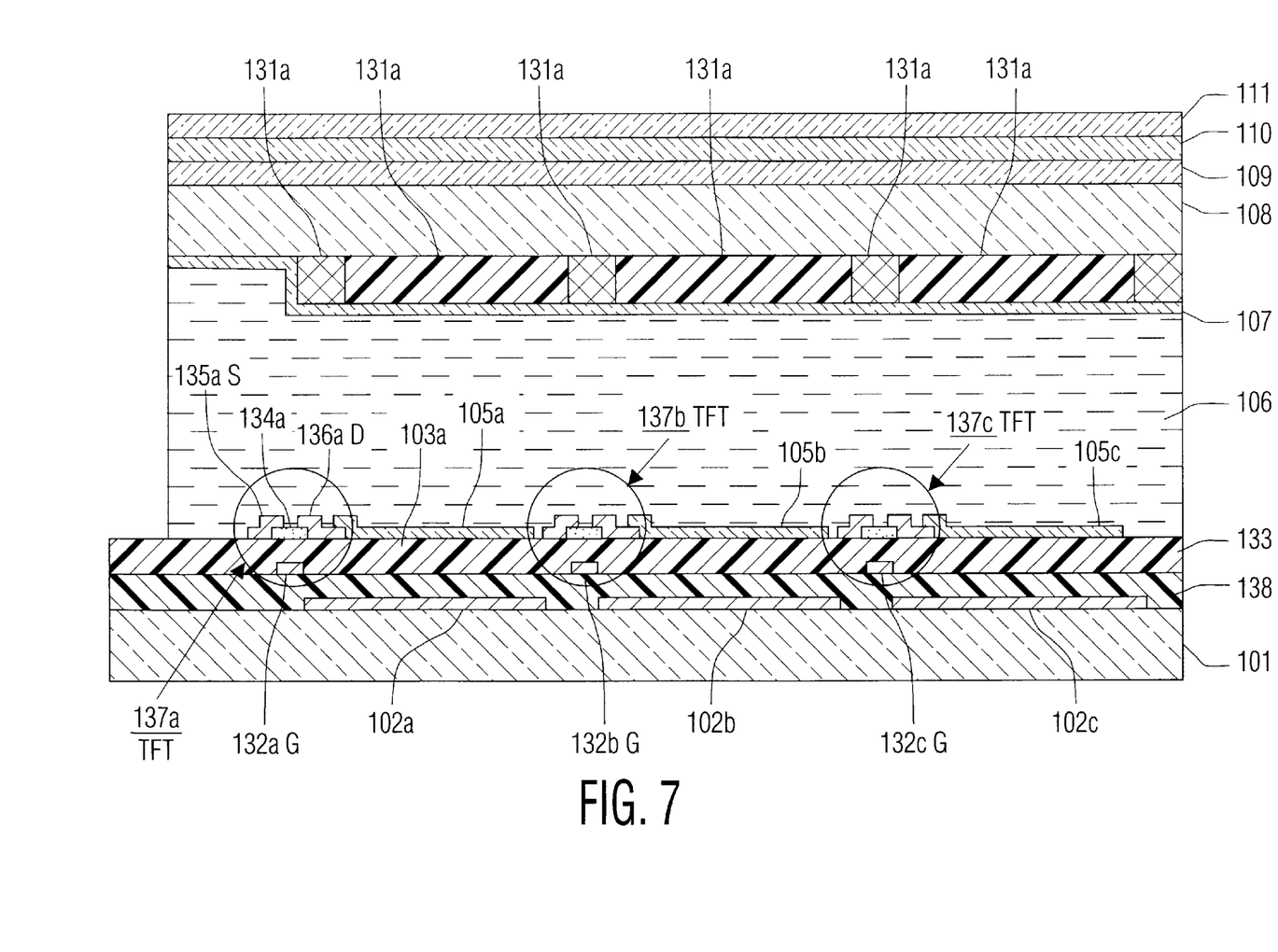
FIG. 7 shows a cross sectional view of the reflective LCD in accordance with the seventh exemplary embodiments of the present invention.

In the following, explanation is made on the reflective LCD of the seventh exemplary embodiment of the present invention referring to FIG. 7 showing a cross sectional view of the exemplary embodiment. For elements which have the same function as in FIG. 5 showing the sixth exemplary embodiment, the same reference numerals are applied and the explanation is omitted.

In this exemplary embodiment also, an active matrix array is formed on a substrate 101. Since the structure and the function of the active matrix array are the same as in the sixth exemplary embodiment, the explanation is omitted. The difference from the sixth exemplary embodiment is that an inter-layer insulating film 138 is newly provided on reflective films 102. Namely, in this exemplary embodiment, the reflective films 102 and gate electrodes 132 are formed at different levels, so that materials for gate electrodes 132 which are the composing elements of the gate array and that for the reflective films 102 can be selected independently. Then more suitable material for performing each function can be adopted and the reflective LCD of higher performance is realized. In FIG. 7, the reflective films 102 are separated by each pixel, however the film can be formed evenly all over the display domain to simplify the process.

Regarding the disposition of the other composing elements such as a transparent substrate and a liquid crystal layer are the same as in the preceding embodiments. Therefore, the explanation is omitted.

In the structure of this exemplary embodiment, the surface of the reflective films 102 are covered by both inter-layer insulating film 138 and gate-insulating film 133, so that the effect of protecting the reflective films 102 is high, and also the display quality can be further improved.

Eighth Exemplary Embodiment

Figure 8:
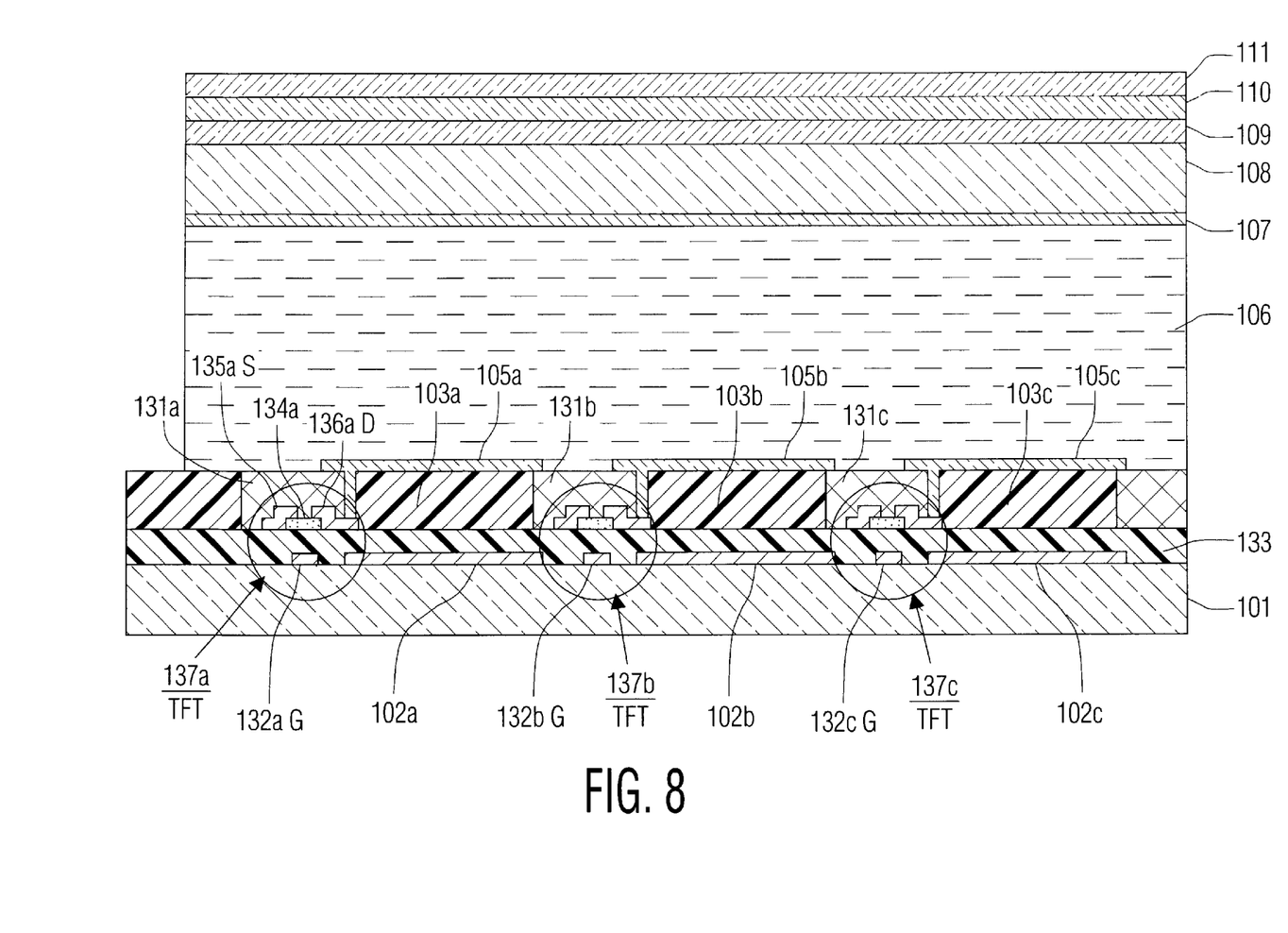
FIG. 8 shows a cross sectional view of the reflective LCD in accordance with the eighth exemplary embodiment of the present invention.

In the following, explanation is made on the reflective LCD of the eighth exemplary embodiment of the present invention referring to FIG. 8 showing a cross sectional view of the exemplary embodiment. For elements which have the same function as in FIG. 5 showing the sixth exemplary embodiment, the same reference numerals are applied and the explanation is omitted.

In this exemplary embodiment also, an active matrix array is formed on a substrate 101. The structure is the same as in the sixth exemplary embodiment except that color filters 103a–103c (hereinafter abbreviated 103) and black matrixes 131a–131c are formed on the active matrix array in this exemplary embodiment, namely the structure of so called Color-Filter-on-Array (CFOA) is adopted in this embodiment. Then, on the color filters, pixel electrodes, viz., the first transparent electrodes 105a–105c (hereinafter abbreviated 105) are formed. The first transparent electrodes 105 and drain electrodes 136a etc are connected through contact window opened through the color filters. In order to improve smoothness and increase of insulating effect, a protecting layer may be laid between the color filters 103 and the first transparent electrodes 105.

As shown in FIG. 8, in the domain corresponding to each pixel electrode viz., the first transparent electrodes 105, Al for reflective films 102a–102c (hereinafter abbreviated 102) is selectively formed. On the reflective films 102, a gate-insulating film 133 is formed. Then, on that, color filters 103a–103c and black matrixes 131a–131c are formed. Then on these, the first transparent electrodes 105 are formed, so that the first transparent electrodes 105 are completely separated electrically and physically from the reflective films 102.

Then, between the substrate 101 and its facing transparent substrate 108, liquid crystal layer 106 is sandwiched. For the transparent liquid crystal layer 106, TN liquid crystal is used.

At the inward-facing surface of the transparent substrate 108, second transparent electrode 107 is formed. The second transparent electrode 107 is formed evenly all over the display domain.

At the outward-facing surface 108, polarizer 111, phase compensating plate 110 and scattering plate 109 are laid bonded.

In the reflective LCD composed as above described, color filters are disposed on the substrate 101 which includes reflective films 102, so that the display quality is not deteriorated by parallax. Also, since the exact voltage is applied by active matrix, better quality display is realized, and also durability against chemicals and reliability are high.

Ninth Exemplary Embodiment

Figure 9:
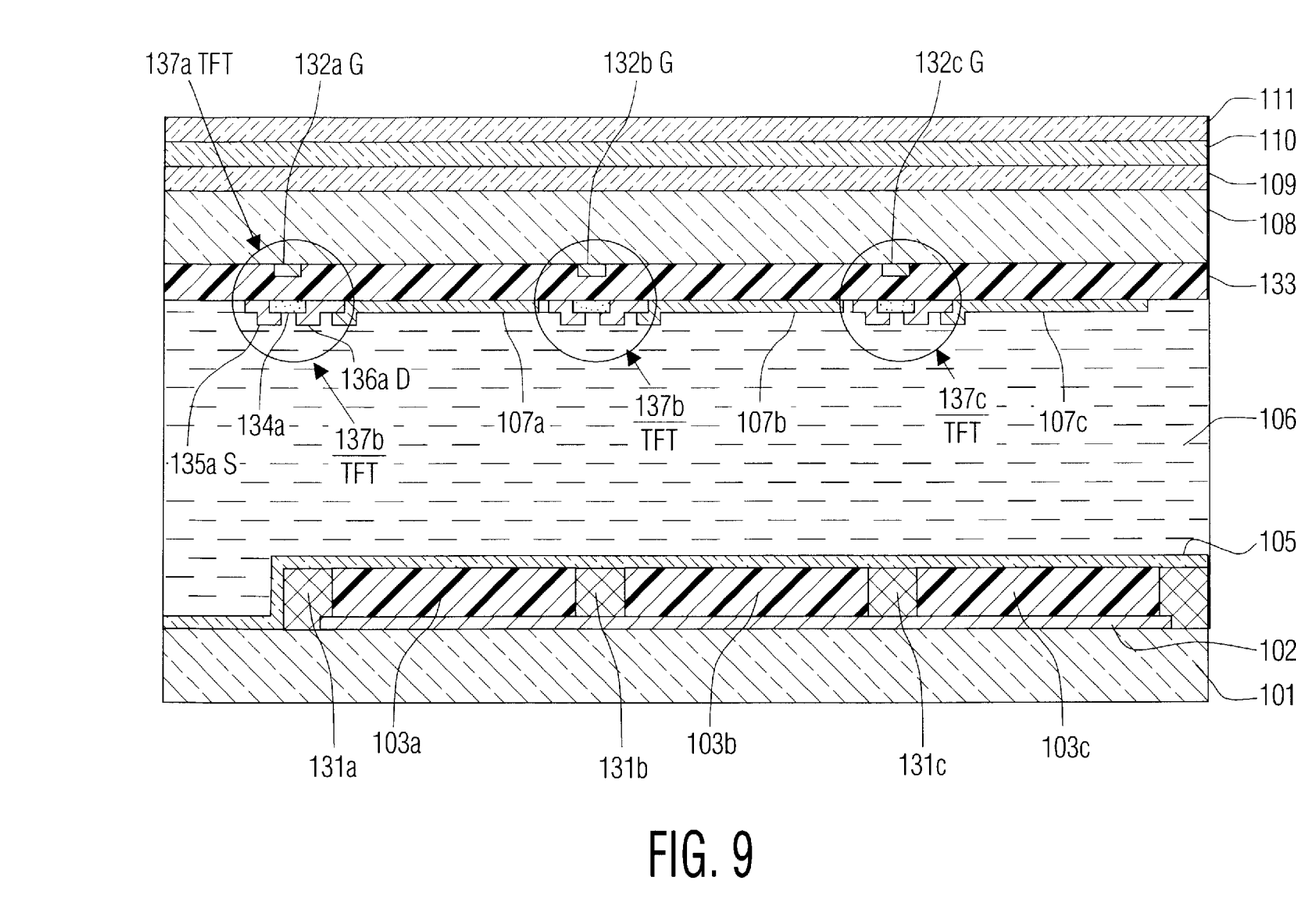
FIG. 9 shows a cross sectional view of the reflective LCD in accordance with the ninth exemplary embodiment of the present invention.

In the following, explanation is made on the reflective LCD of the ninth exemplary embodiment of the present invention referring to FIG. 9 showing a cross sectional view of the exemplary embodiment. For elements which have the same function as in FIG. 8 showing the eighth exemplary embodiment, the same reference numerals are applied and the explanation is omitted. In this exemplary embodiment, an active matrix array is formed at the side of a transparent substrate.

On a substrate 101, Al for a reflective films 102 is selectively formed at the domain corresponding to a display part.

Then, on the reflective films 102, striped color filters 103a–103c and black matrixes 131a–131c are selectively formed, and on these, a first transparent electrode 105 is formed. The first transparent electrode 105 is evenly formed all over the display domain. Before forming the first transparent electrode, the color filters are covered by a protecting layer if necessary. The reflective films 102 are electrically insulated from the first transparent electrode 105 by the color filters 103a–103c and by the black matrixes 131a–131c, so that the corrosion caused by electrochemical reaction at the patterning process of the transparent electrode 105 is suppressed.

Between the substrate 101 and its facing transparent substrate 108, a liquid crystal layer 106 is sandwiched. For the liquid crystal layer 106, TN liquid crystal, which suits for an active matrix array, is used.

The difference between this exemplary embodiment and the sixth exemplary embodiment is that the active matrix array is formed at the inward-facing surface of the transparent substrate 108 and the color filters are provided at the side of the substrate 101. The structure is the same as in the exemplary embodiment 6. Namely, as shown in FIG. 9, the active matrix array comprises gate electrodes 132a–132c, a gate-insulating film 133, hydrogenated amorphous silicon semiconductors 134a–134c, source electrodes 135a–135c, and drain electrodes 136a–136c. And, each drain electrode of each TFT is connected to each pixel electrode, viz., to each of second transparent electrodes 107a–107c. The pixel electrodes, viz., the second transparent electrodes 107a–107c are disposed at the positions corresponding to the color filters 103a–103c which are formed on the substrate 101.

At the outward-facing surface of the transparent substrate 108, a polarizer 111, phase compensating plate 110 and scattering plate 109 are laid bonded.

The structure described above also provides a reflective color LCD which has the feature of a single polarizer type, and has a high display quality, high brightness and high color purity which are the features of active matrix, and also has features of superior processing, durability against chemicals and reliability.

In each of the exemplary embodiments described above, amorphous silicon TFT is used for the active element of the active matrix array. However, in the present invention, the active element is not limited to this. Polysilicon TFT is also usable. And in the above exemplary embodiments, the gate electrodes are positioned under the semiconductor, namely it is the type called "bottom gate type". However, it can be "top gate type" in which the gate electrodes are positioned at upper side of the semiconductor or a coplanar type. As for the active element, a Metal-Insulator-Metal (MIM) type diode is also usable. As described above, the reflective LCD of the present invention is that the liquid crystal is sandwiched between the substrate and its facing transparent substrate. And at the inward-facing surface of the substrate, the first transparent electrodes are formed, and also a separating layer or the same functional color filters or gate-insulating film, and the reflective film are formed. At the inward-facing surface of the transparent substrate, the second transparent electrodes are formed. And the reflective film is electrically and physically separated from the first transparent electrodes. The reflective surface of the reflective film is positioned inside the cell, so that the feature of a single polarizer type is kept. Also, since the reflective film is covered by the protecting layer, different from the conventional one, the scratching of the reflective film hardly occurs during the assembling process, and the inspection and the handling are easy, and also durability against chemicals and the reliability are superior. Also by combining with the active matrix, the reflective LCD of higher brightness and higher display quality, compared with conventional types, is realized.

What is claimed is:

1. A reflective liquid crystal display device comprising:
   a substrate,
   a transparent substrate,
   a liquid crystal layer between said substrate and said transparent substrate,
   a first transparent electrode, an electrically insulating protecting layer, a color filter layer and a reflective film formed in order between said liquid crystal layer and said substrate, and
   a second transparent electrode between said transparent substrate and said liquid crystal layer,
      wherein said electrically insulating protecting layer and said color filter layer physically and electrically separate said reflective film from said first transparent electrode.

2. The reflective liquid crystal display device of claim 1, wherein said electrically insulating protecting layer is made of acrylic resin.

3. The reflective liquid crystal display device of claim 1, wherein said reflective film includes aluminum and is covered with an insulating layer which is formed by anodic oxidation of said reflective film.

* * * * *

UNITED STATES PATENT AND TRADE MARK OFFICE
CERTIFICATE OF CORRECTION

PATENT NO. : 6,122,027
DATED : September 19, 2000
INVENTOR(S) : Ogawa et al.

It is certified that error appears in the above-identified patent and that said Letters Patent is hereby corrected as shown below:

Cover page, item [54], title, before "LIQUID" insert --REFLECTIVE--.

Signed and Sealed this

Twenty-second Day of May, 2001

Attest:

NICHOLAS P. GODICI

Attesting Officer     Acting Director of the United States Patent and Trademark Office